US 8,913,136 B2

(12) United States Patent
Iwase

(10) Patent No.: US 8,913,136 B2
(45) Date of Patent: Dec. 16, 2014

(54) IMAGE DISPLAY DEVICE, MOBILE TERMINAL, NON-TRANSITORY COMPUTER READABLE MEDIUM, AND IMAGE DISPLAY METHOD

(75) Inventor: Kazuhisa Iwase, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 571 days.

(21) Appl. No.: 13/238,750

(22) Filed: Sep. 21, 2011

(65) Prior Publication Data

US 2012/0242846 A1  Sep. 27, 2012

(30) Foreign Application Priority Data

Mar. 25, 2011  (JP) ................. 2011-068682

(51) Int. Cl.
*H04N 5/225* (2006.01)
*H04N 5/222* (2006.01)
*H04N 13/02* (2006.01)
*H04N 1/00* (2006.01)
*G03G 15/36* (2006.01)
*G03G 15/00* (2006.01)
*G06F 3/12* (2006.01)

(52) U.S. Cl.
CPC ............ *G03G 15/5087* (2013.01); *G06F 3/121* (2013.01); *H04N 1/00278* (2013.01); *G03G 2215/00109* (2013.01); *G03G 15/36* (2013.01); *G03G 15/5016* (2013.01); *H04N 1/00129* (2013.01); *H04N 1/00442* (2013.01); *G06F 3/1234* (2013.01); *G06F 3/1292* (2013.01); *H04N 2201/3253* (2013.01)
USPC .............. 348/207.2; 348/333.01; 348/333.02; 348/50

(58) Field of Classification Search
CPC .................................. H04N 1/00278
USPC .......... 348/207.2, 207.99, 218.1, 39, 50, 157, 348/211.13, 211.3
See application file for complete search history.

(56) References Cited

U.S. PATENT DOCUMENTS

| | | | |
|---|---|---|---|
| 6,195,513 B1* | 2/2001 | Nihei et al. .................... | 396/332 |
| 7,053,916 B2* | 5/2006 | Kobayashi et al. ........... | 345/633 |
| 7,275,986 B2 | 10/2007 | Mori et al. | |
| 7,516,421 B2* | 4/2009 | Asano et al. .................. | 715/850 |
| 2004/0145594 A1 | 7/2004 | Kobayashi et al. | |
| 2004/0192424 A1 | 9/2004 | Mori et al. | |
| 2005/0280661 A1 | 12/2005 | Kobayashi et al. | |
| 2007/0124436 A1* | 5/2007 | Shepherd ....................... | 709/223 |
| 2007/0132872 A1* | 6/2007 | Sato et al. ................. | 348/333.01 |

FOREIGN PATENT DOCUMENTS

| | | |
|---|---|---|
| JP | 2002-232782 A1 | 8/2002 |
| JP | 2004-62756 A | 2/2004 |
| JP | 2004-240480 A | 8/2004 |
| JP | 2004-283419 A | 10/2004 |
| JP | 2008-148858 A | 7/2008 |
| JP | 2010-67093 A | 3/2010 |

* cited by examiner

*Primary Examiner* — Ahmed A Berhan
(74) *Attorney, Agent, or Firm* — Sughrue Mion, PLLC

(57) ABSTRACT

An image display device includes: an imaging unit; an apparatus specifying unit that specifies an object apparatus imaged by the imaging unit; a state acquisition unit that acquires an operating state of the apparatus; an image generating unit that generates an image corresponding to the specified apparatus and the acquired operating state; a positioning unit that determines a reference position of the image acquired by the imaging unit; a combining unit that combines the generated image with the image acquired by the imaging unit using the reference position; and a display that displays the combined image.

12 Claims, 16 Drawing Sheets

FIG. 3

| APPARATUS IDENTIFIER | DETAILED INFORMATION ON APPARATUS | | | | |
|---|---|---|---|---|---|
| | DISPLAY NAME | TYPE | LOCATION INFORMATION 1 | LOCATION INFORMATION 2 | APPARATUS CONFIGURATION |
| Printer 01 | MY PRINTER | TypeA | xxxxx NORTH LATITUDE, yyyyy EAST LONGITUDE | YOKOHAMA | STANDARD |
| Printer 02 | 3F PRINTER | TypeB | wwwww NORTH LATITUDE, qqqqq EAST LONGITUDE | ZZZ BUILDING 3F | LARGE-CAPACITY TRAY, CREASER |
| ⋮ | ⋮ | ⋮ | ⋮ | ⋮ | ⋮ |

| APPARATUS IDENTIFIER | OPERATING STATE | USER | IMAGE ID | INFORMATION ON COMBINING METHOD |
|---|---|---|---|---|
| Printer 01 | Idle | All | GL1 | POSITION (0, 0, 0), SIZE RATIO 1:1, RELATIVE ANGLE (0, 0) |
| Printer 01 | Printing | Power user | GL2-1 | POSITION (100, 200, 0), SIZE RATIO 1:1, RELATIVE ANGLE (0, 0) |
| Printer 01 | Printing | Admin | GL2-2-1 | POSITION (100, 200, 0), SIZE RATIO 1:1, RELATIVE ANGLE (0, 0) |
| | | | GL2-2-2 | POSITION (−100, 200, 0), SIZE RATIO 1:0.5, RELATIVE ANGLE (0, 0) |
| Printer 01 | Jam | ALL/ Power user | JG3-1 | POSITION (100, 200, 0), SIZE RATIO 1:1, RELATIVE ANGLE ($\pi/4$, $\pi/4$) |
| Printer 01 | Jam | Admin | JG3-2 | POSITION (100, 200, 0), SIZE RATIO 1:1, RELATIVE ANGLE ($\pi/4$, $\pi/4$) |
| Printer 02 | Idle | ... | ... | ... |
| Printer 02 | Printing | ... | ... | ... |
| ⋮ | ⋮ | ⋮ | ⋮ | ⋮ |

TM

M

M

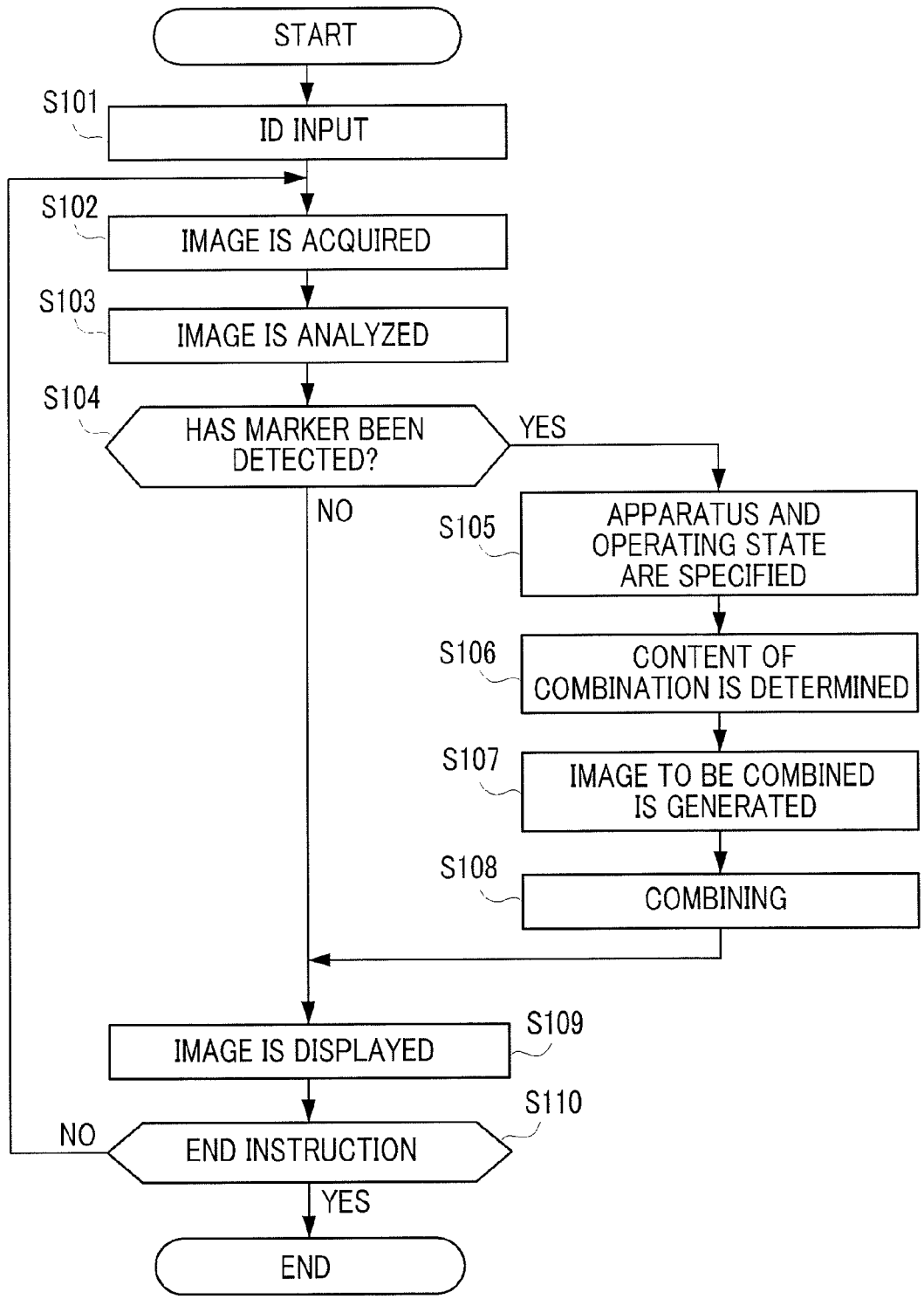

IMAGE DISPLAY DEVICE, MOBILE TERMINAL, NON-TRANSITORY COMPUTER READABLE MEDIUM, AND IMAGE DISPLAY METHOD

CROSS-REFERENCE TO RELATED APPLICATIONS

This application is based on and claims priority under 35 USC 119 from Japanese Patent Application No. 2011-068682 filed Mar. 25, 2011.

BACKGROUND

Technical Field

The present invention relates to an image display device, a mobile terminal, a non-transitory computer readable medium, and an image display method.

SUMMARY

According to an aspect of the invention, there is provided an image display device including: an imaging unit; an apparatus specifying unit that specifies an object apparatus imaged by the imaging unit; a state acquisition unit that acquires an operating state of the apparatus; an image generating unit that generates an image corresponding to the specified apparatus and the acquired operating state; a positioning unit that determines a reference position of the image acquired by the imaging unit; a combining unit that combines the generated image with the image acquired by the imaging unit using the reference position; and a display that displays the combined image.

BRIEF DESCRIPTION OF THE DRAWINGS

Exemplary embodiment(s) of the present invention will be described in detail based on the following figures, wherein:

FIG. 3 is a view showing an example of the information stored in a printer management table;

FIG. 4 is a view showing an example of the information stored in a combined information management table;

FIG. 9 is a view showing a combining processing operation;

DETAILED DESCRIPTION

Embodiments

Figure 1:
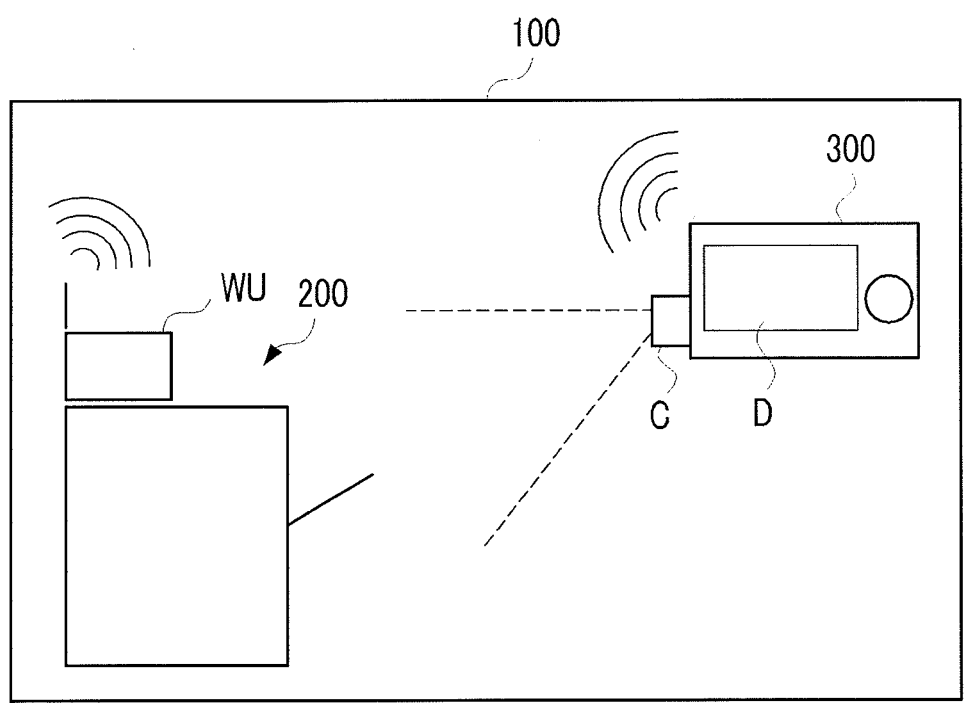
FIG. 1 is a schematic diagram of an image display system.

FIG. 1 is a view showing the outline of an image display system 100 according to an exemplary embodiment of the invention. The image display system 100 includes an image forming apparatus 200 and a mobile terminal 300.

The image forming apparatus 200 is a printer with a communication function which uses an electrophotographic method, a thermal transfer method, an ink jet method, or the like. In addition, although one image forming apparatus 200 is displayed in FIG. 1, the plural (kinds of) image forming apparatuses 200 may be present as will be described later. The image forming apparatus 200 includes a user interface, such as a touch panel that receives a document for which an image is to be formed, a print command, printing conditions, and the like and displays the content, an image processor, a paper supply mechanism, an image forming mechanism (for example, a charging unit, a photoconductor unit, an exposure unit, a developing unit, a transfer unit, a fixing unit, and the like are included in the case of an electrophotographic printer), and a paper discharge mechanism. The image forming apparatus 200 forms an image on a recording medium (for example, paper or a film sheet) on the basis of image data according to the designated number of copies to be printed, the designated printing conditions, and the like. In addition, the image forming apparatus 200 may have a function associated with the image forming function. For example, the image forming apparatus 200 may have a scanner function or have a device (large-capacity receiving unit), which is set around the main body and receives paper separately from the main body, or a device (so-called finisher) which performs post-processing, such as creasing or stapling, on the printed paper. In addition, the image forming apparatus 200 is an example of various kinds of electronic apparatuses for realizing the set functions.

In addition, the image forming apparatus 200 includes a sensor or a controller that analyzes an output signal from the sensor, which has a function of monitoring an operating state of the apparatus and sending a notification to the outside through a radio communication unit WU when necessary. This notification function is realized by providing an infrared communication module, an IEEE module, and a Bluetooth (registered trademark) module in the image display system 100, for example. The notification may be sent automatically (at the set timing) or may be sent when a request from the outside (for example, the mobile terminal 300) is received through the radio communication unit WU. The operating state is information regarding the current state of the apparatus, such as whether or not the apparatus is operating normally, whether or not the apparatus is likely to malfunction soon even though there is no error at present, whether or not an error has occurred, which kind of error it is if an error has occurred, or which kind of operation is being executed when there are plural selectable operations.

The mobile terminal 300 is a portable terminal, such as a mobile phone, a smart phone, a tablet PC, or a PDA (personal digital assistant). Specifically, the mobile terminal 300 includes an input unit (a touch panel, a keyboard, and the like) used when a user performs various kinds of operation, a display screen D (liquid crystal display and the like) which displays various kinds of information, a radio communication module for radio communication with another apparatus (for example, an infrared communication module, a communication module based on the IEEE802.11 method, and a Bluetooth (registered trademark) module; not shown in FIG. 1), and a camera C.

Figure 2:
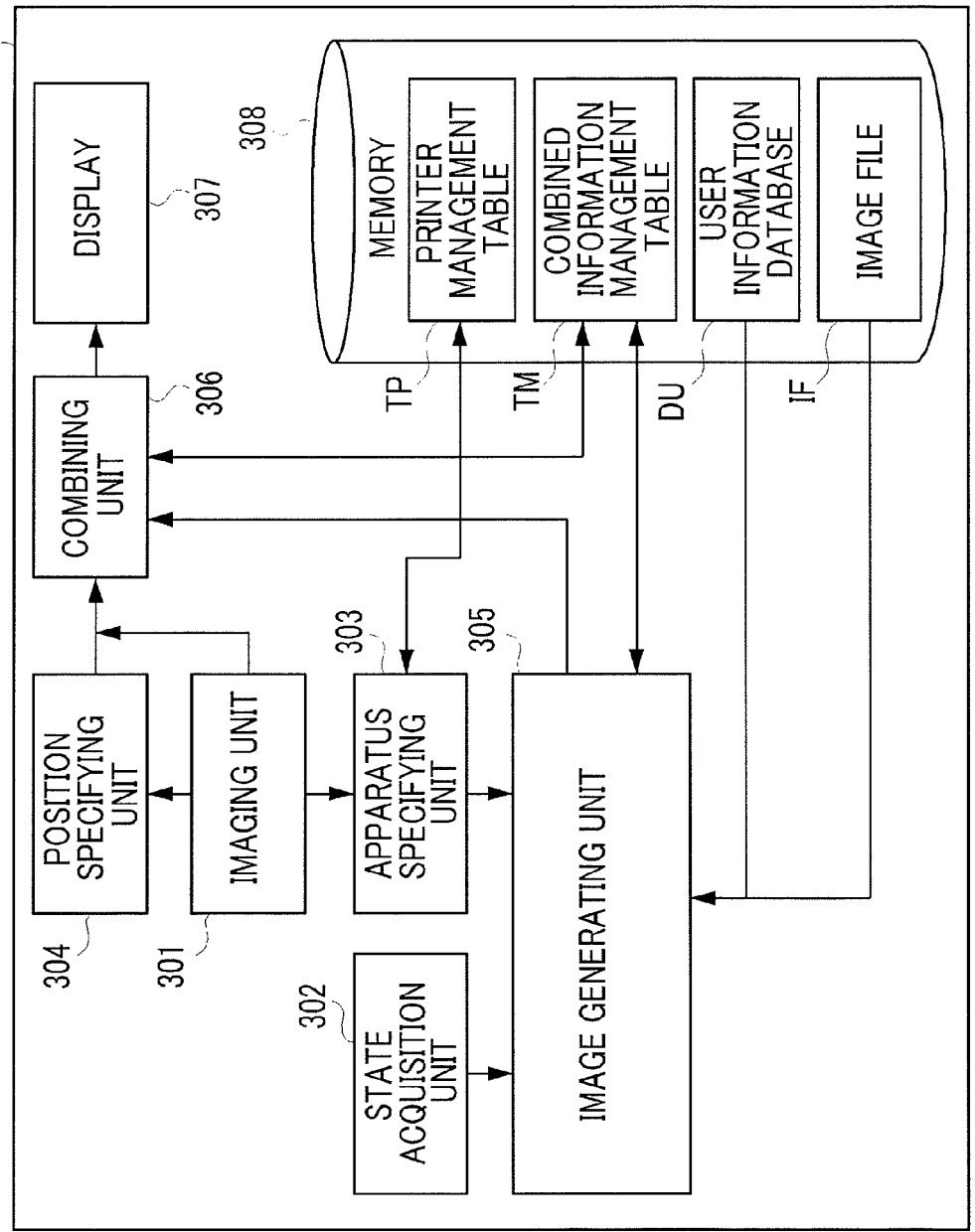
FIG. 2 is a view showing the functional configuration of a mobile terminal.

FIG. 2 is a view showing the function of the mobile terminal 300. The mobile terminal 300 is functionally configured to include an imaging unit 301, a state acquisition unit 302, an apparatus specifying unit 303, a position specifying unit 304, an image generating unit 305, a combining unit 306, a display 307, and a memory 308. The memory 308 is a storage device, such as a ROM or a hard disk. A user information database DU, a printer management table TP, and a combined information management table TM are stored in the memory 308. Moreover, although not shown, a program for realizing the function of the mobile terminal 300, such as an OS program, and various kinds of data required to realize the function in each unit of the mobile terminal 300 are stored temporarily or permanently in the memory 308 in addition to those described above.

FIG. 3 shows an example of the information stored in the printer management table TP. In the printer management table TP, detailed information regarding the image forming apparatus 200 is stored so as to match an identifier for uniquely identifying the image forming apparatus 200. The detailed information includes a name (display name) of the image forming apparatus 200, the type, a place (location) where the image forming apparatus 200 is installed, and the apparatus configuration. The information stored in items of the apparatus configuration is information regarding whether or not the image forming apparatus 200 has standard functions (a printer function, a scanner function, and a FAX function) and whether or not the image forming apparatus 200 has a receiving function of a large-capacity paper receiving unit or a creasing function in addition to the standard functions. Thus, referring to the printer management table TP, it is possible to uniquely identify the image forming apparatuses 200 with different apparatus configurations or functions.

FIG. 4 shows an example of the information stored in the combined information management table TM. In the combined information management table TM, an image ID for identifying an image used in combining processing (hereinafter, when this image is generated by combining two or more image parts, this image or each image part is called a combined object) and information regarding a method of combining images are stored so as to match a combination of the identifier, the operating state, and the user.

The combined object is image data stored in an image file IF. For example, the combined object is image data schematically showing the flow of paper in the image forming apparatus 200 (this is called a combined object 1). In addition, the combined object is an image showing the size of paper received in each paper receiving unit (for example, plural cubic objects according to the size ratio of paper; this is called a combined object 2). In addition, the combined object is an image showing that a paper jam has occurred (for example, an image showing crumpled paper; this is called a combined object 3).

As an example of matching between an operating state and an image ID, the combined object 1 is matched when the operating state is "normal", the combined object 2 is matched when the operating state is "printing", and the combined object 3 is matched when the operating state is "paper jam". In addition, plural images may be matched to a set of apparatus identifier, user, and operating state (refer to the third record from above in FIG. 4). For example, when the operating state is "paper receiving unit 2 has no paper and the amount of remaining toner is small", a combined object expressing "paper out" and a combined object expressing a state where the amount of remaining toner is small are matched to the operating state. In short, it is preferable to perform matching such that an image to be combined corresponding to the operating state is selected for each image forming apparatus 200.

The information regarding a combining method is information required when generating an image to be combined with another image and combining the image with another image, for example. That is, the information regarding a combining method is information indicating in which position (region) of the image the shape or the size of the combined object is made to overlap. Specifically, the information regarding a combining method includes information expressing the position as a reference for superposition (relative position of an image to be combined with respect to the position of the image forming apparatus 200 on another image), the ratio of the sizes of the apparatus and the object, and the direction of the apparatus and the direction (relative direction) of the combined object. That is, when the position, size, and direction of the image forming apparatus 200 which is an object to be imaged are given by referring to the combining method information, it is determined in which position, size, and direction an image overlapping another image is disposed. For example, when determining the position or the like on the image of the image forming apparatus 200 according to the state (size of a marker on the image or the degree of distortion of the shape) of an imaged marker using a two-dimensional image attached to the image forming apparatus 200 as a marker, the relative position may be expressed as three-dimensional coordinates (x, y, z) of a combined object when placing the marker on the origin of the three-dimensional virtual space. The size of the combined object may be expressed as the area of an image region corresponding to the marker and the area (or the length of the side) of a drawing region of an image to be combined. The direction may be expressed as an angle ($\theta$, $\phi$) between a direction of the imaged marker (for example, a direction defined by a normal vector) and a reference direction which is set on the image.

Displaying an object in a three-dimensional manner as described above means that when the size or the direction (that is, the position of the camera C) of a marker changes, the shape expressed as a two-dimensional image of an object displayed according to the change also changes. Thus, correct understanding of a user is expected by generating a composite image according to the camera position. In addition, plural composite images generated on the basis of different camera positions for the same operating state are presented to the user, so that the user understands the operating state better.

In addition, the information regarding a combining method may not necessarily need to include all items of information regarding the position, the size, and the direction, and may include at least the position. For example, when the size of an object is small or the object has a spherical shape or when it is not necessary to express a direction, information regarding the size or the direction may be omitted. That is, the combined object may not have three-dimensional information. In short, it is preferable to specify at least the position such that a user who sees an image after combining understands the operating state of the image forming apparatus 200 with the help of the image after combining by disposing a combined object at a position corresponding to the position of each unit of the image forming apparatus 200 on the image.

Thus, matching an image ID and a combining method to each apparatus identifier is done because an appropriate combined object and an appropriate combining method are determined according to the overall size (external shape), the internal structure, and a function which differ depending on the image forming apparatus 200.

In addition, matching a different image ID and a different combining method to the same apparatus identifier according to the operating state is to take into consideration that a portion which needs to attract the notice of a user where the operating state is different (for example, a unit related to a specific function, a portion and a part in which a specific material is used, or a place where an error occurs) may be different. For example, it is preferable that an image for describing the operation of the entire image forming apparatus 200 be easily selected in the normal operating state while only an image related to a part where an error has occurred is selected so that the user pays attention to the part when an error occurs. In addition, changing a combined image or a combining method according to a user who operates the mobile terminal 300 (may also be a user of the image forming apparatus 200) is to take into consideration that the method and content of assistance in understanding the operating state change with a user. For example, typical users do not have much information about the internal structure of the image forming apparatus 200. Therefore, it is thought that it is preferable as an assistance method to express the operating state as easily as possible using a relatively simple image rather than expressing the operating state in detail using many images. On the other hand, since a user who has administrator privileges is expected to have sufficient information about the internal structure, it is thought that it is preferable as an assistance method to present a large amount of information using many images or to include the detailed information on the combined image. In addition, a combination of the same apparatus identifier, operating state, image ID, and combining method information may be assigned to plural users (refer to the fourth record in FIG. 4).

Thus, if at least the apparatus identifier and the operating state are given, an image to be combined and its combining method are specified by referring to the printer management table TP. Then, by presenting an image after combining to the user, the assistance for understanding of an appropriate operating state according to the image forming apparatus 200 and its operating state (or a user item may be added) is realized.

In the image file IF, image data of the image to be combined (combined object) described above is stored. In addition, the image data may be still image data or video data. In addition, the image data may be vector data required to draw plural objects. In this case, the image data may be two-dimensional image data based on a format, such as JPEG, bit map, or tiff. In addition, the image data may be motion data required to form a video image or may be a program for generating other 3D (three-dimensional) images. In short, it is preferable that the image data be information required to execute drawing processing on an image which is to be displayed so as to overlap an image.

In the user information database DU, the authority that the user has in regard to the use of the image forming apparatus 200 or the classification of authority is stored so as to match the information, such as a user name, a user ID, or a password which identifies the user of the image display system 100. The classification of authority is "normal user (ALL)", "manager (Admin)", and "Power user", for example. This is to meet the condition that "the image forming apparatus 200 has a function of restricting functions that the user may execute according to the authority". For example, this is a function of accepting an instruction for a monochrome copy from the normal user but of refusing an instruction for a color copy. Alternatively, this is a function in which the image forming apparatus 200 controls the content of display of a touch panel so that it is possible for a user belonging to the "manager" to change printing setting freely but it is not possible for other users to perform printing setting.

Figure 5:
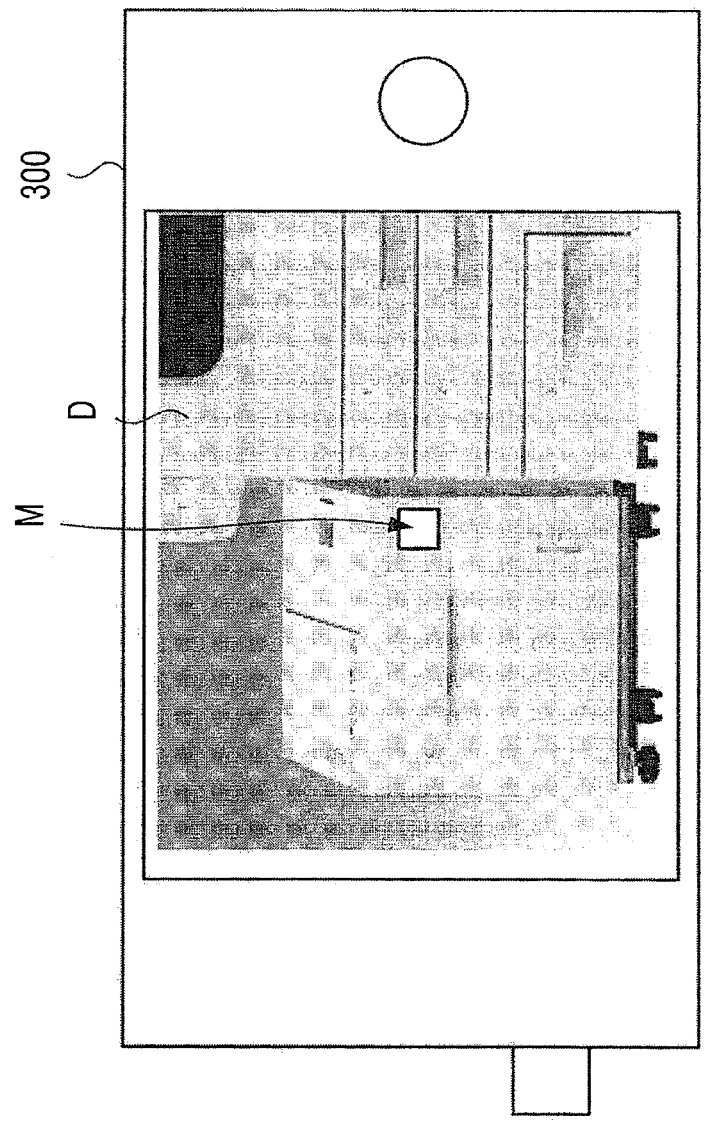
FIG. 5 is a view showing an example of a captured image displayed on a mobile terminal.

The imaging unit 301 is a digital camera that includes a lens, an imaging device, and an image processor and that outputs a captured image as digital data (video data or still image data). FIG. 5 shows an example in which the output digital data is displayed on the display screen D. In this example, a square sheet-like marker M is attached to the image forming apparatus.

The state acquisition unit 302 is realized by a radio communication module and receives the information regarding the operating state transmitted from the radio communication unit WU (hereinafter, simply referred to as an operating state). The acquired operating state is supplied to the image generating unit 305. Examples of the operating state include an idling state (printing is not executed (waiting for an instruction from a user)), printing, and paper jam.

Figure 6:
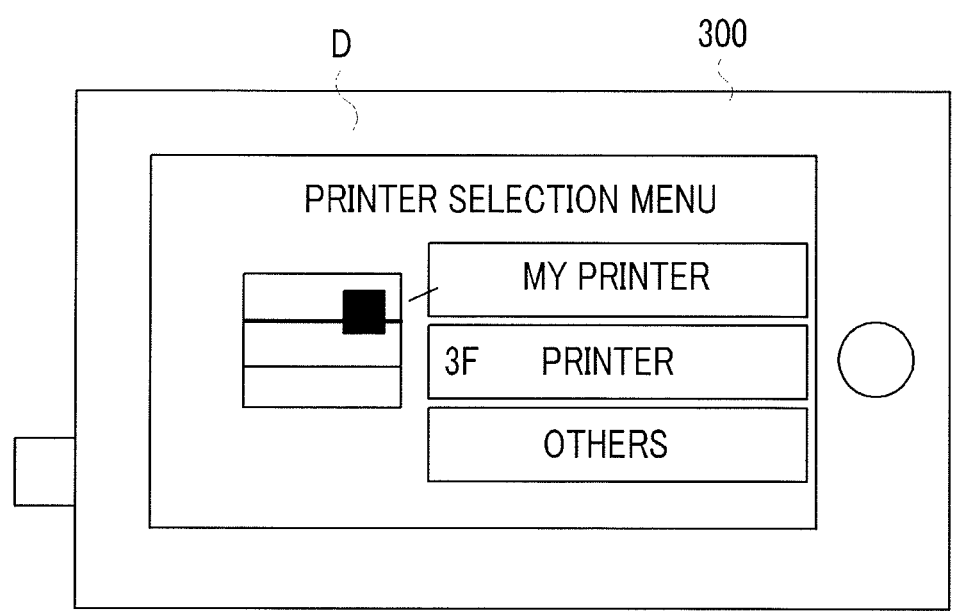
FIG. 6 is a view showing a printer selection screen.

The apparatus specifying unit 303 is realized by a unit that receives an instruction from a user and displays the information, such as a touch panel, a control processor that reads or writes the information from or on the memory 308, and the like, and specifies the image forming apparatus 200 to be imaged. As described above, the objects of the image combining processing in the present exemplary embodiment may be the plural image forming apparatuses 200. In this case, it is necessary to specify the image forming apparatuses 200 whose images to be combined are to be generated, and the apparatus identification is performed by the apparatus specifying unit 303. Specifically, names of the plural image forming apparatuses 200 which are candidates for image configuration are registered in advance in the memory 308, and the apparatus specifying unit 303 displays a list of the registered names on the display screen D in order to prompt a user to select one of the image forming apparatuses 200 to be imaged. FIG. 6 shows an example of a screen which prompts a selection. The apparatus specifying unit 303 displays a list of the image forming apparatuses 200 to be selected. In addition, when one image forming apparatus 200 is designated, the apparatus specifying unit 303 reads and displays the apparatus information which is stored in the printer management table TP so as to be associated with the apparatus. By displaying this information, the apparatus specifying unit 303 assists the user in specifying the image forming apparatus 200 imaged by itself. The user who sees the displayed screen specifies one image forming apparatus 200, which is imaged, and selects the image forming apparatus 200 on the screen. Then, an identifier of the selected image forming apparatus 200 is output.

Alternatively, the image forming apparatus 200 may be specified on the basis of a result of image analysis of the position specifying unit 304 instead of making a user specify the image forming apparatus 200. Specifically, the image data regarding the appearance of each image forming apparatus 200 or the information indicating the feature of the image forming apparatus 200 extracted from the image data may be registered in advance in the memory 308, and the image forming apparatus 200 to be imaged may be determined by determining most similar registered image data from the image data obtained by imaging.

Figure 7:
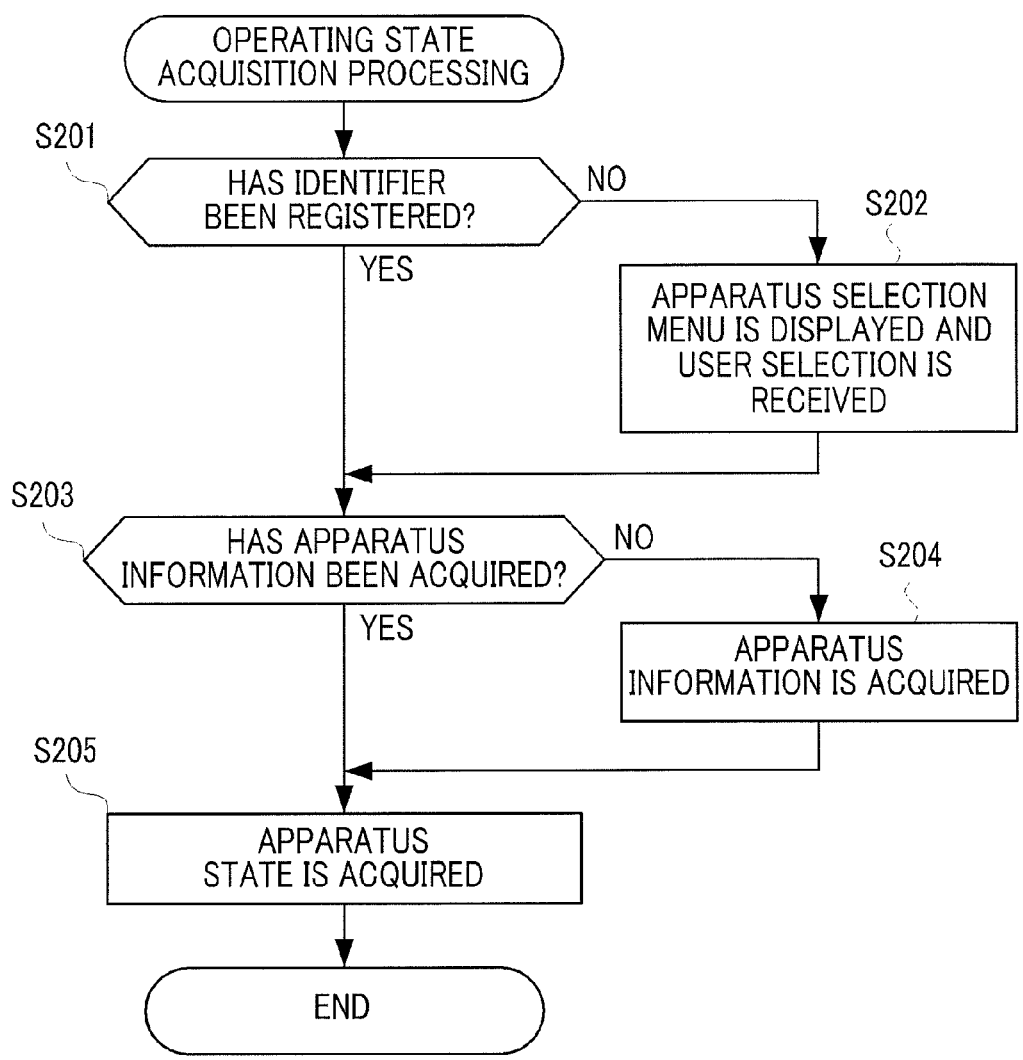
FIG. 7 is a view showing an operation of specifying an image forming apparatus and its operating state.

FIG. 7 is a view showing the flow of processing of the image forming apparatus 200 to be imaged and specification of the operating state.

Hereinafter, it is assumed that when the image forming apparatus 200 transmits the information, at least the apparatus identifier is included in the information. In addition, when the image forming apparatus 200 detects a change of the operating state, the image forming apparatus 200 transmits a current operating state (that is, an operating state after the change) through the radio communication unit WU together with the apparatus identifier stored in the image forming apparatus 200.

When the mobile terminal 300 receives the identifier and the operating state from the image forming apparatus 200, it is determined whether or not the identifier is already registered on the memory 308 (S201). When the identifier is not registered, the apparatus specifying unit 303 displays the screen shown in FIG. 6 on the display screen D to prompt selection of the user (S202). The user specifies the image forming apparatus 200 to be imaged referring to the information displayed on the display screen D, such as a printer name and the installation place, and selects the specified image forming apparatus 200. As a result, the apparatus specifying unit 303 acquires the apparatus identifier of the image forming apparatus 200 specified by the user.

Then, it is determined whether or not the apparatus information is stored so as to match the identifier (S203). When the apparatus information is not included in the received information and the apparatus information is not included in the stored information, a signal which requests transmission of the apparatus information to the image forming apparatus 200 is transmitted. Then, the operating state is extracted from the apparatus information included in the received information (S205). In addition, the operating state may not be included in the received information depending on the operating state transmission timing of the image forming apparatus 200. In this case, a signal which requests an operating state may be transmitted from the mobile terminal 300 to the image forming apparatus 200, or the mobile terminal 300 may wait until the operating state is received. Alternatively, when an operating state is received before from an apparatus specified by the apparatus identifier, it may be considered that the same operating state is received this time. Alternatively, it may be considered that a state (for example, "waiting for printing") set as a default operating state in advance is acquired. In this way, the image forming apparatus 200 to be imaged is uniquely identified in the mobile terminal 300, and the operating state is specified.

In addition, the apparatus information may be updated when necessary. For example, when information which is not stored in the printer management table TP is included in the apparatus information received from the image forming apparatus 200, the information may be added to the printer management table TP. In addition, when different information from the information stored in items in the received apparatus information is included, the stored information may be rewritten in the received information. Thus, by allowing the rewriting, a change is reflected on the stored content of the combined information management table TM when there is a change in the apparatus installation position or the associated apparatus configuration.

The position specifying unit 304 is realized by an image processor, and determines whether or not the image forming apparatus 200 is included in objects to be imaged by analyzing the image data output from the state acquisition unit 302.

When the image forming apparatus 200 is included in objects to be imaged, the position specifying unit 304 specifies a model of the image forming apparatus 200 and determines the positional relationship (in other words, viewing position of photographing) between the camera C and the image forming apparatus 200 which is an object to be imaged. Specifically, a sheet-like recording medium (so-called marker) on which a pattern image set in advance is formed is attached to the image forming apparatus 200 in order to express the reference position, and the content of the image pattern or the information regarding the actual size is stored in the memory 308. Then, the position specifying unit 304 performs image analysis in order to determine whether or not the pattern image is included in the image acquired by the imaging unit 301 (that is, whether or not a marker is attached to the object to be imaged). As a result, it is determined whether or not the imaged apparatus is to be subjected to combining processing. When an image corresponding to the pattern image is included, the position specifying unit 304 calculates the size of the imaged marker, a direction (distortion condition of the marker shape) of the marker direction in four directions (up, down, left, and right), and the like from the image data. Then, the position specifying unit 304 determines the viewing position of imaging (in other words, positional relationship between the camera C and the object to be imaged (specifically, distance and direction)) on the basis of the calculation result and the actual shape and size of the marker registered in advance.

In addition, instead of using the size of a marker in order to specify the viewing position, it is also possible to include the position information in the marker itself and detect the position information from the acquired image data. For example, the mobile terminal 300 is made to have a function of measuring its own position using a GPS (global positioning system) or the like and a function of detecting the direction of the apparatus (that is, a direction of the camera C) using a gyro sensor or the like, and a seal on which a two-dimensional barcode expressing the position information (for example, longitude and latitude) is printed as a marker is used. The position specifying unit 304 determines a distance from the camera C to the marker and the direction on the basis of the position information acquired from the marker and the position information on its own apparatus.

Alternatively, the information expressed by the two-dimensional barcode may be a URL of a position information server in which the position information on the image forming apparatus 200 is stored, and the mobile terminal 300 may acquire the position information on the image forming apparatus 200 by accessing the server. Alternatively, when the position information on the image forming apparatus 200 is included in the information acquired through the state acquisition unit 302, the viewing position may be determined using this information.

The image generating unit 305 is realized by an image processor and the like, and generates an image to be combined (merged) with the image acquired by the imaging unit 301 on the basis of the apparatus identifier acquired by the apparatus specifying unit 303, the operating state acquired by the state acquisition unit 302, and the user information acquired in advance. Specifically, an image ID and a combining method corresponding to a set of apparatus identifier, operating state, and user acquired are specified with reference to the combined information management table TM. For example, if the apparatus identifier is "printer 01" and the user is "All" in the example shown in FIG. 3, performing the combining processing using the image data specified by an image GL1 is specified. The image generating unit 305 generates an image of a marker serving as a reference position for combining. In addition, the image generating unit 305 reads corresponding image data from the image file IF, performs image processing for changing the position, size, direction, and the like of the combined object according to the combining method, and outputs the result as image data based on a format, such as JPEG or bit map. The combining unit 306 is realized by an image processor, and combines the image data supplied from the imaging unit 301 with the image data supplied from the image generating unit 305.

The display 307 is realized by the display screen D, which has a liquid crystal panel and the like, and a driving circuit therefor and displays the image data after combining supplied from the combining unit 306.

Figure 8A:
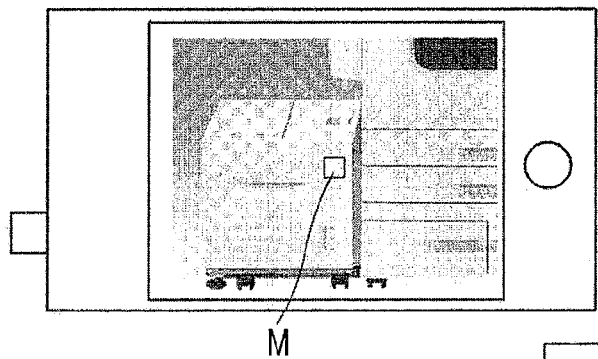
FIG. 8A is a view showing an example of an image of a combined source, an image to be combined, and an image after combining processing.
Figure 8B:
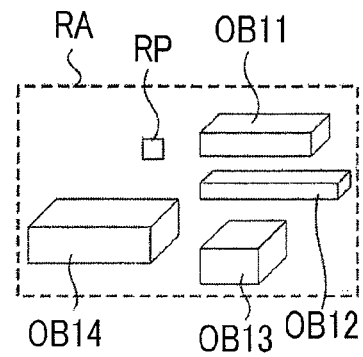
FIG. 8B is a view showing an example of an image of a combined source, an image to be combined, and an image after combining processing.
Figure 8C:
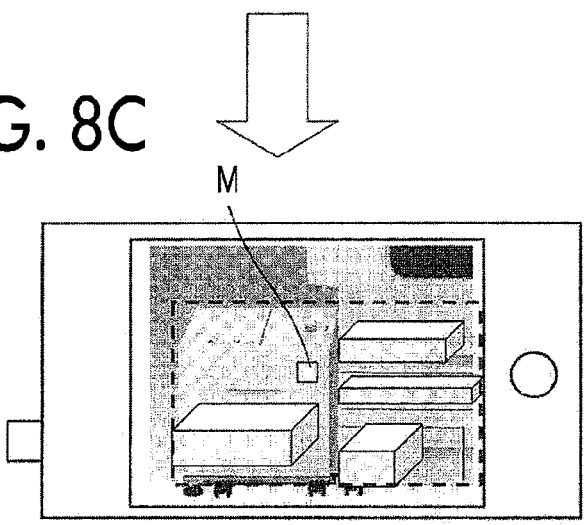
FIG. 8C is a view showing an example of an image of a combined source, an image to be combined, and an image after combining processing.

FIGS. 8A to 8C show an example of combining processing executed in the image generating unit 305 and the combining unit 306. FIG. 8A shows an image captured by the camera C when the operating state of the image forming apparatus 200 is "normal". Here, the marker M is attached to an upper right portion of the large-capacity paper receiving unit. FIG. 8B shows an image (including combined objects OB11, OB12, OB13, and OB14), which is generated on the basis of a combined object and a combining method specified by the specified image ID, and an image RP serving as a reference position when combining the above image (that is, an image displayed so as to match the position of the imaged marker M). FIG. 8C is obtained by combining FIGS. 8A and 8B, and this is displayed on the display screen D. Here, OB11, OB12, and OB13 are objects for making a user recognize visually easily the presence of paper received in each paper receiving unit in the main body of the image forming apparatus 200, the size, and the amount (the number of sheets of paper). OB14 is an object corresponding to paper received in the large-capacity paper receiving unit. Thus, by the presence of the combined objects put on the image, it is possible for the user to intuitively see the information regarding the inside of the apparatus which is not seen in the normal use state (in this case, the size of paper or the number of remaining sheets of paper).

FIG. 9 is a view showing the flow of combining processing. In the following example, it is assumed that a marker is attached to the image forming apparatus 200 and a user who carries the mobile terminal 300 has come close to the image forming apparatus 200. First, the user inputs a user ID to the mobile terminal 300 for user authentication, for example. Referring to the user information database DU, the mobile terminal 300 specifies the authority regarding the use of the image forming apparatus 200 of the user on the basis of the input ID (S101). The user performs an operation for executing a camera function on the mobile terminal 300 and performs imaging by turning the camera C in a direction of the image forming apparatus 200 which is a desired object (S102). The image data is acquired by the imaging unit 301. The imaging unit 301 displays the acquired image on the display screen D and supplies the image data to the apparatus specifying unit 303. The apparatus specifying unit 303 performs image analysis of the image data (S103). When a marker is not detected by the position specifying unit 304 (S104: No), the combining processing is not performed and the captured image is continuously displayed as it is on the display screen D (S109).

When a marker is detected (S104, Yes), the image forming apparatus 200 and its operating state are specified by the apparatus specifying unit 303 (S105). The image generating unit 305 determines a combined object and a combining method (S106), and generates an image used in the combining process (S107). The combining unit 306 combines the generated image with the image data (S108). The image data after combining is displayed on the display screen D (S109). When an end instruction from the user is input to the mobile terminal 300 (S110, Yes), the mobile terminal 300 ends the series of processing. Then, the processing of steps S102 to S109 is repeated until the end instruction from the user is input. As a result, the captured image and an image, which is combined with the captured image and reflects the operating state, are updated in real time.

Figure 10:
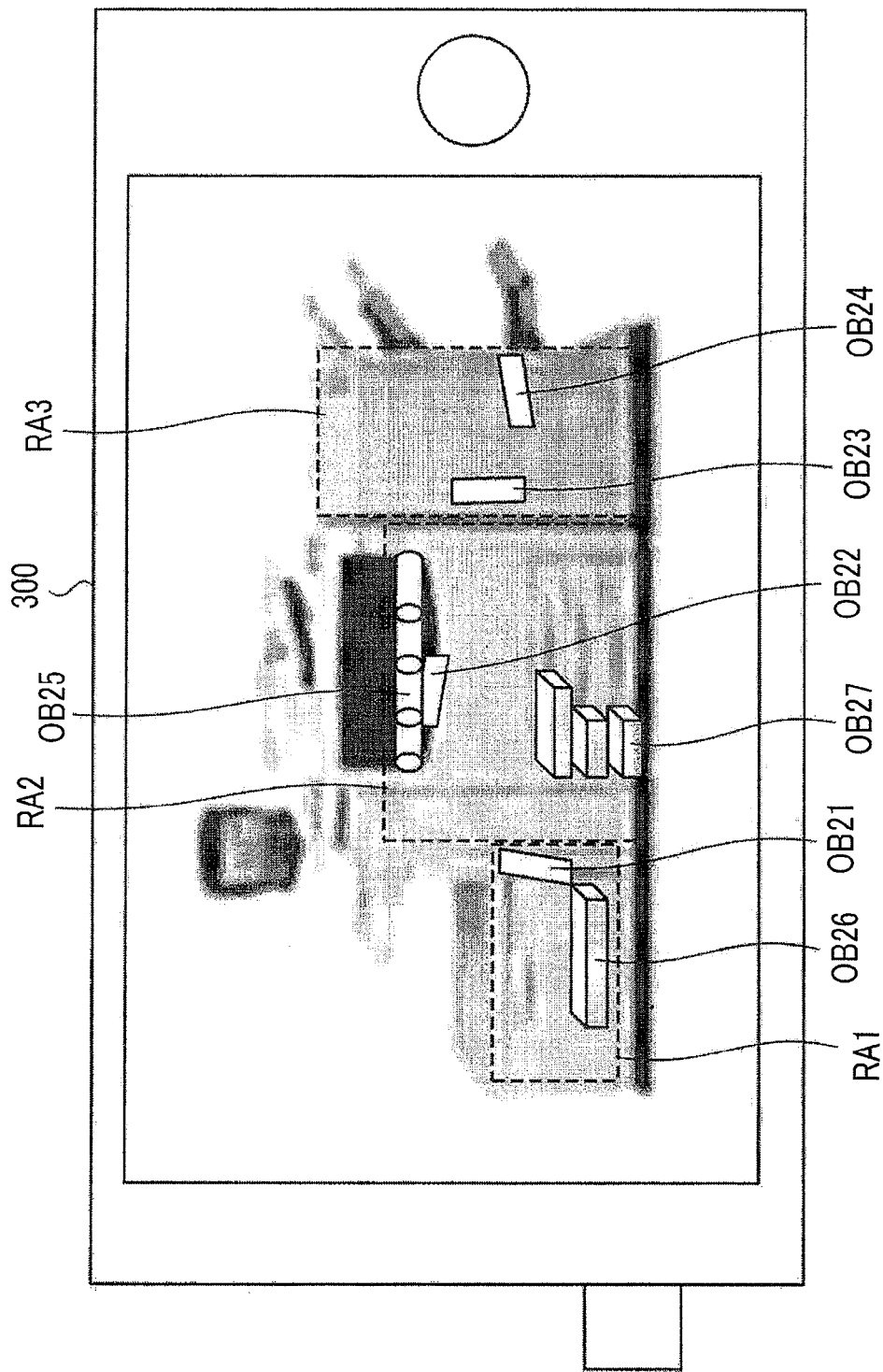
FIG. 10 is a view showing an example of an image after combining (in normal operating state)

Hereinafter, some examples of an image after combining will be described. FIG. 10 is an example of a composite image of the image forming apparatus 200 when the operating state is "normal". In addition, a marker image is not shown in FIG. 10. The imaging point of the image forming apparatus 200 is almost the front side, and imaging is performed such that the entire image forming apparatus 200 is settled. The image forming apparatus 200 is schematically configured to include a main body (RA2) which forms an image, a large-capacity receiving unit (RA1), and a finisher (RA3). Objects OB21, OB22, OB23, OB24, OB25, OB26, and OB27 are included in the displayed composite image. OB26 and OB27 express the presence and the size of paper received in each paper receiving unit. OB21, OB22, OB23, and OB24 express that a series of paper flow are normally performed, that is, paper taken out from the paper receiving unit is transported to OB22, image forming processing is performed in OB22 using toner expressed as OB25 and then the image-formed paper is transported to reach OB23, and the paper finally reaches a discharge port expressed as OB24.

Figure 11:
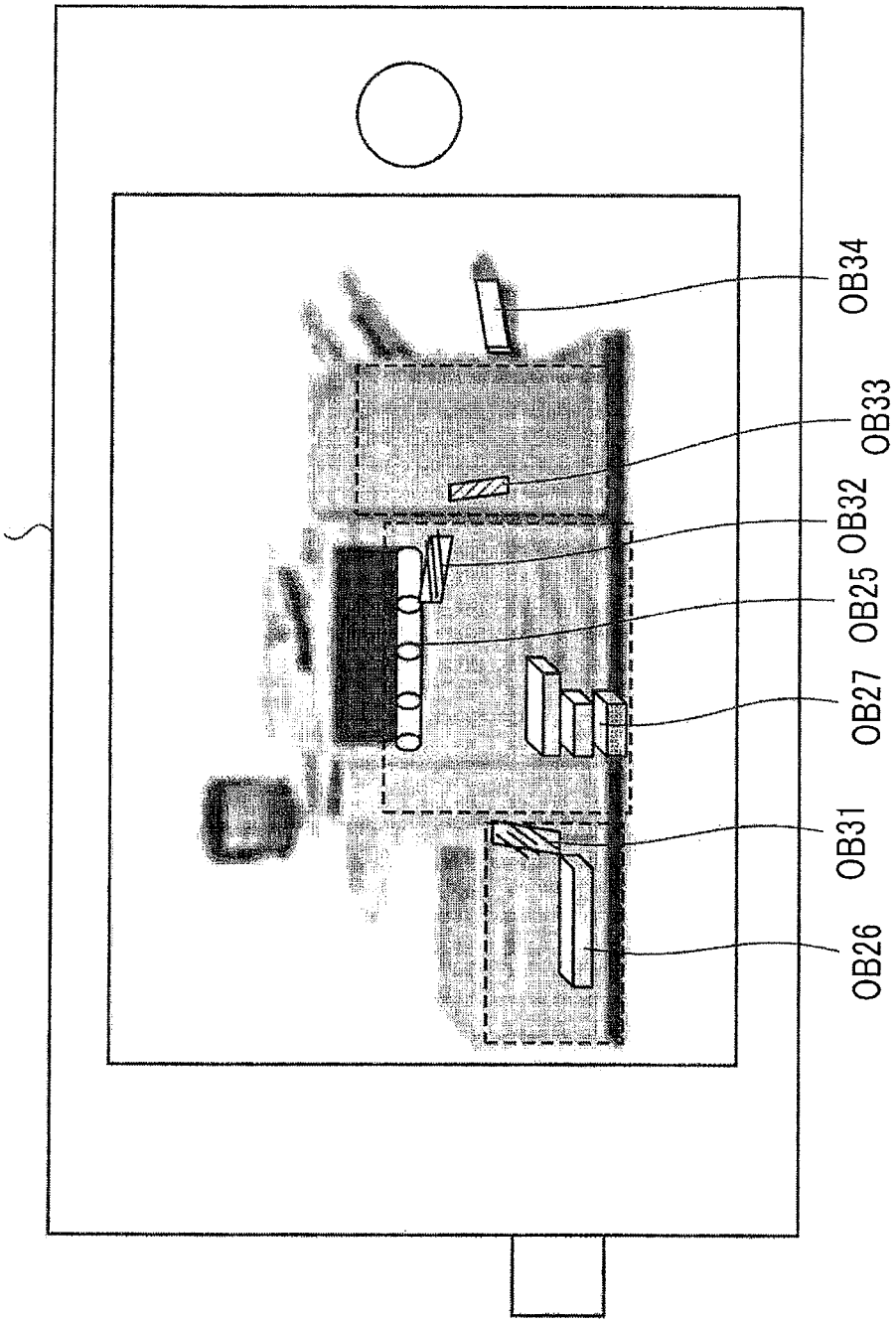
FIG. 11 is a view showing an example of an image after combining (when an error occurs)

On the other hand, FIG. 11 shows an example of a composite image, which is generated on the basis of image data imaged from the same viewing point, when the operating state is "error caused by paper jam" in the same image forming apparatus 200. The composite image shown in FIG. 11 is different from that shown in FIG. 10 in that OB31, OB32, and OB33 are replaced with OB21, OB22, and OB23, respectively. Specifically, positions, shapes, and sizes of the replaced objects are the same, but a different color (for example, red) is given. Thus, by matching the content of an image after combining according to the difference between the normal operating state and the paper jam state, the error occurrence situation or the content and location of an error (in this case, there is an error in the transport process with no error in a paper receiving unit or a member related to transfer) are visually transmitted to the user. In addition, color change may be performed or the shape or the size may be changed together with color change when expressing a different operating state.

Figure 12:
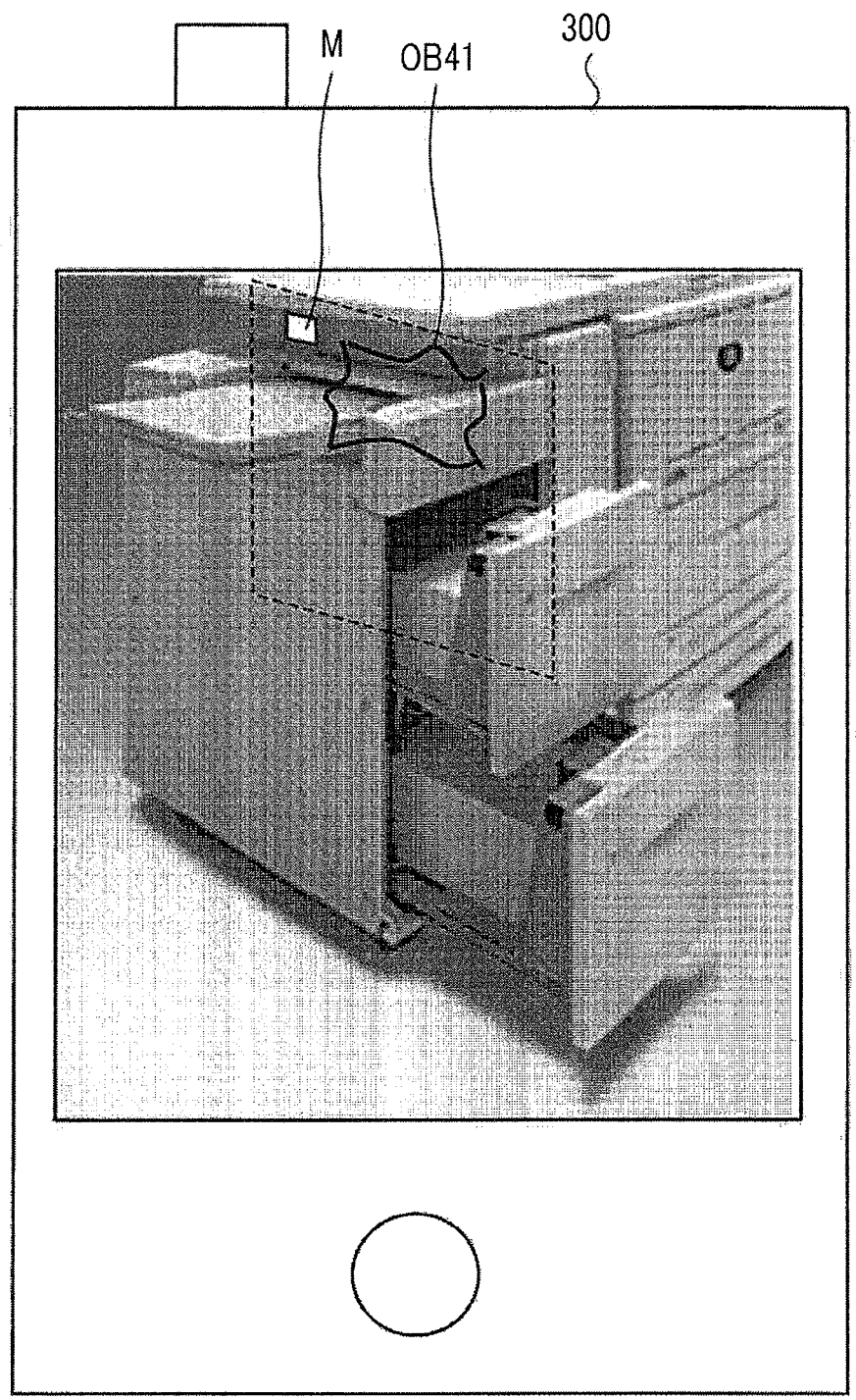
FIG. 12 is a view showing another example of an image after combining (when an error occurs)

FIG. 12 is an example of a composite image obtained when imaging the image forming apparatus 200 from the left-inclined front side. In this example, an object OB41 showing the situation where paper is bent is combined with the image corresponding to paper jam occurring in the image forming apparatus 200. In this case, from the degree of distortion of the image of the marker M obtained by photographing, it is specified that the camera view is 45° from the left-inclined front side of the apparatus to be imaged. According to the information on the marker M and the combining method stored in the combined information management table TM, the position, size, and direction of OB41 are determined. Thus, regardless of the position of the viewing point, an appropriate image is combined in an appropriate shape so as to match the captured image.

Figure 13:
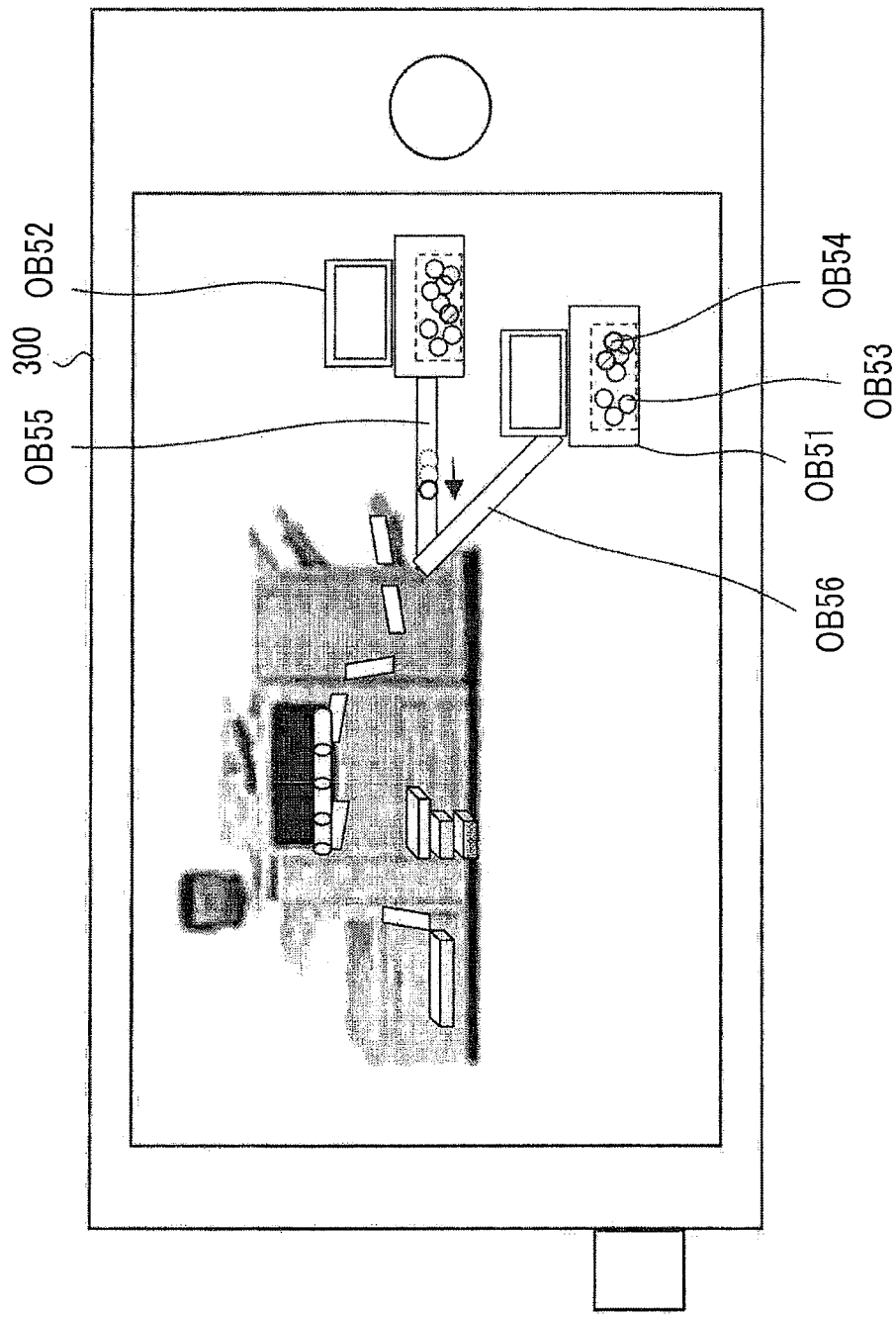
FIG. 13 is a view showing another example of an image after combining (in normal operating state)

FIG. 13 is another example of a composite image generated on the basis of an image obtained by imaging the image forming apparatus 200. The composite image shown in FIG. 13 is different from that shown in FIG. 10 in that OB51, OB52, OB53, OB54, OB55, and OB56 are added. OB51 and OB52 are images showing computers which are connected to the image forming apparatus 200 by communication lines (expressed as OB55 and OB56 in FIG. 13) and which instruct the image forming apparatus 200 to execution printing. OB53 and OB54 are print commands output from the computers, and express processing which has not yet been completely printed. The difference between OB53 and OB54 is that OB53 is a print command output from a user of a mobile terminal while OB54 is a print command output from a user other than the above user. This is realized by storing the information, which specifies all print commands transmitted from OB52 and OB54 to the image forming apparatus 200 and a person who sends each print command, and including the information regarding the print command in the information regarding the operating state transmitted from the image forming apparatus 200.

Thus, it is also possible to generate an image showing a computer, which is relevant to the operating state of the image forming apparatus 200 but is located at the place physically distant from the image forming apparatus 200, or an image showing the intangibles invisible to the eye, such as information including a print command that the image forming apparatus 200 receives, and to combine the image with the acquired image data. That is, the combining processing in the present exemplary embodiment is not necessarily limited to an image showing a part, which is actually present in the captured image forming apparatus 200, and the position of the image forming apparatus 200 on the image and the display position of an object do not necessarily need to overlap each other on the image after combining.

Other Embodiments

Figure 14:
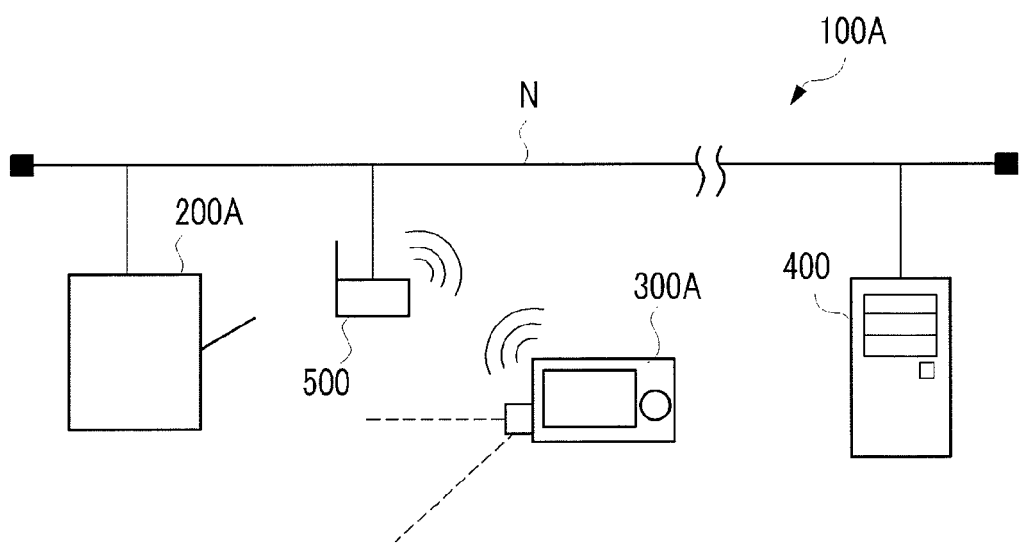
FIG. 14 is a schematic diagram of an image display system.

FIG. 14 is a view showing the outline of an image display system 100A according to another exemplary embodiment. The image display system 100A includes an image forming apparatus 200A, a mobile terminal 300A, a server apparatus 400, and a communication relay device 500. The image forming apparatus 200A is connected to the server apparatus 400 through a wired network N. The image forming apparatus 200A is different from the image forming apparatus 200 in that the image forming apparatus 200A does not have a function of performing radio communication with the mobile terminal 300A and has a function of receiving a print command from the server apparatus 400 and executing printing. The image forming apparatus 200A transmits an apparatus identifier, apparatus information, and an operating state to the mobile terminal 300A through the communication relay device 500.

The communication relay device 500 is connected to the wired network N. The communication relay device 500 transmits or receives information to or from the mobile terminal 300A using radio communication and also transmits or receives information to or from the image forming apparatus 200A and the server apparatus 400 through the wired network N. That is, the communication relay device 500 has a function of relaying communication between the mobile terminal 300A and the image forming apparatus 200A or the server apparatus 400.

Figure 15:
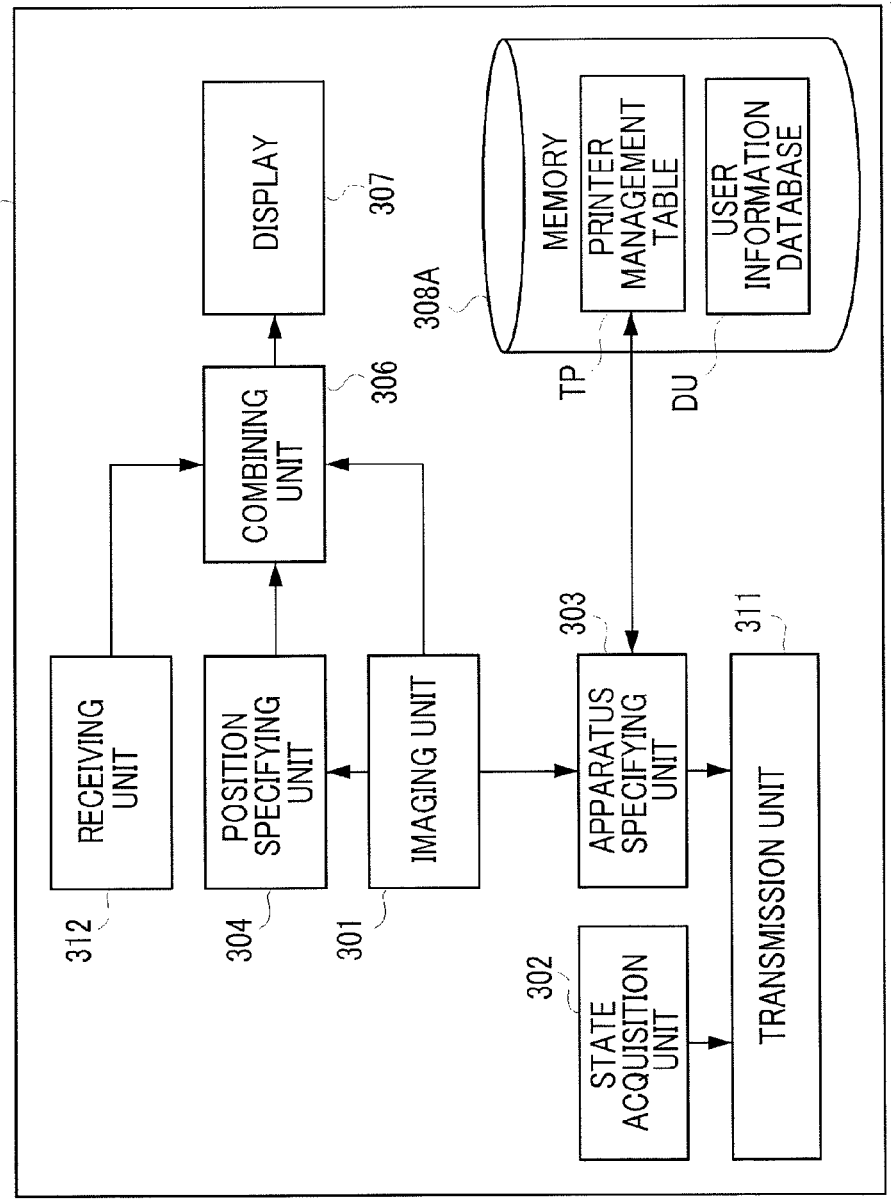
FIG. 15 is a view showing the functional configuration of a mobile terminal.

FIG. 15 is a view showing the functional configuration of the mobile terminal 300A. Moreover, in FIG. 15, the same components as in the mobile terminal 300 are denoted by the same reference numerals. The mobile terminal 300A includes an imaging unit 301, a state acquisition unit 302, an apparatus specifying unit 303, a position specifying unit 304, an image generating unit 305, a combining unit 306, a display 307, a memory 308A, a transmission unit 311, and a receiving unit 312. The transmission unit 311 and the receiving unit 312 are realized by a radio communication module. The mobile terminal 300A is the same as the mobile terminal 300 in that the image forming apparatus 200A is imaged using a camera function and an apparatus identifier, an operating state, and a user are specified. However, the mobile terminal 300A does not have a function of generating an image to be combined. The mobile terminal 300A transmits the apparatus identifier and the operating state to the server apparatus 400 using the transmission unit 311. That is, in the image display system 100A, the server apparatus 400 has a function of generating an image to be combined. When the image to be combined which is generated by the server apparatus 400 is received, the receiving unit 312 supplies it to the combining unit 306. The content of combining processing in the combining unit 306 and the operation of the display 307 are the same as those in the mobile terminal 300.

Figure 16:
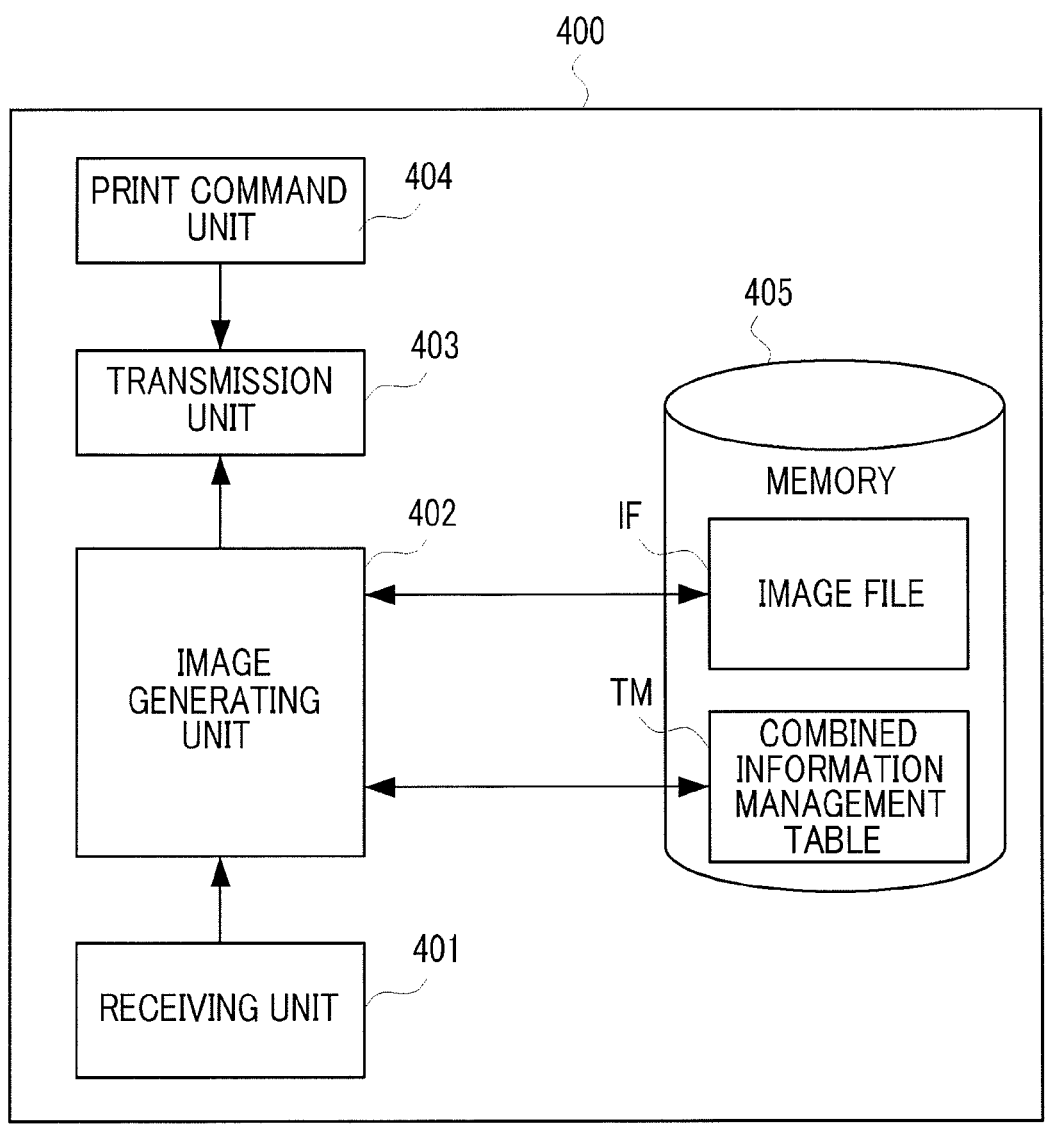
FIG. 16 is a view showing the functional configuration of a server apparatus.

FIG. 16 is a view showing the functional configuration of the server apparatus 400. The server apparatus 400 includes a receiving unit 401, an image generating unit 402, a transmission unit 403, a print command unit 404, and a memory 405. The receiving unit 401 and the transmission unit 403 are realized by a communication interface for performing communication with another apparatus through the wired network N. The image generating unit 402 is realized by an image processor and the like. The memory 405 is a storage device, such as a ROM or a hard disk, and stores the printer management table TP and the image file IF. The print command unit 404 is formed by a processor and the like, and controls the operation of the image forming apparatus 200A by transmitting a printing execution command or a cancel command of a printing instruction to the image forming apparatus 200A through the transmission unit 403 and the wired network N and receiving the state of the image forming apparatus 200A when necessary. Since processing in which the image generating unit 402 generates an image to be combined by accessing the image file IF with reference to the combined information management table TM is the same as the processing realized by the combining unit 306, the combined information management table TM, and the image file IF, detailed explanation thereof will be omitted. Thus, in the image display system 100A, an apparatus other than the mobile terminal has a function of generating an image to be combined. In other words, an apparatus (location) other than an apparatus (or location) which performs imaging may generate an image to be combined. Alternatively, if the mobile terminal has at least a function of displaying an image after combining transmitted from the external apparatus, not only the processing of generating an image to be combined but also combining processing may be performed by the external apparatus.

In the above-described embodiment, all images captured are objects to be combined regardless of a camera view. However, only an image captured in the specific photographing condition may be combined. For example, a user images the same image forming apparatus 200 in the same operating state from different viewing points, and the mobile terminal 300 supplies each item of the acquired image data to the position specifying unit 304 so that one item of the image data is selected. Specifically, the position specifying unit 304 performs image analysis, specifies the reference position as described above, and selects an image (for example, an image with least hand tremor) determined to have the best quality using a set image evaluation algorithm.

Alternatively, one image which is most correctly expressed in the operating state may be selected. For example, when the operating state is "occurrence of an error in a paper discharge unit", the mobile terminal 300 selects an image in which the paper discharge unit is photographed largest. Specifically, the information regarding the structure of the image forming apparatus 200 (for example, information indicating at which position (region) of the entire image forming apparatus 200 the paper discharge unit is located) is stored in the memory 308 in advance. Using this information, the position specifying unit 304 specifies a region, in which the paper discharge unit is located, on the image from the result of image analysis for each item of the image data and determines an image with the largest specified region. Combining processing is executed only for the determined image.

In the above-described embodiment, an object to be imaged is an image forming apparatus. However, this is just an example, and all kinds of electronic apparatuses other than that may also be objects to be imaged. In other words, the operating state described above is not limited to those related to image generation. In short, it may be an image display device including: an imaging unit; an apparatus specifying unit that specifies an object apparatus imaged by the imaging unit; a state acquisition unit that acquires an operating state of the apparatus; an image generating unit that generates an image corresponding to the specified apparatus and the acquired operating state; a positioning unit that determines a reference position of the image acquired by the imaging unit; a combining unit that combines the generated image with the image acquired by the imaging unit using the reference position; and a display that displays the combined image.

As a method used when the mobile terminal 300 acquires an operating state, the mobile terminal 300 may transmit a request signal (polling) to the image forming apparatus 200 at set periods. Alternatively, when the image forming apparatus 200 detects a change in the operating state, the image forming apparatus 200 may transmit it to the mobile terminal 300 spontaneously. "When there is a change in the operating state" refers to a situation immediately before the occurrence of an error, such as "when power is ON (OFF)", "when an error, such as paper jam, occurs", "when the amount of remaining toner is less than the set threshold value", "when the degree of consumption of a photoconductor drum exceeds the set threshold value", and "when the number of sheets of paper received is less than the set threshold value".

The position of a marker attached or the number of markers is arbitrary. For example, plural markers may be provided at different positions. In this case, even if one marker is not reflected on an image due to an operation (for example, opening or closing of the door) of a user, it is possible to execute combining processing using the information on the other imaged markers. In addition, when plural markers are detected, a camera view or an apparatus position may be calculated using a known algorithm and the position information from the plural markers in order to improve the calculation accuracy. In addition, when a marker detected before is no longer detected due to a user operation of opening or closing the door, an image after combining which is currently displayed may be continuously displayed for a period, which is set in advance, instead of stopping the combining processing.

In addition, the mobile terminal 300 may have an interface for external output that transmits the image data after combining, which is output from the combining unit 306, to an external apparatus as it is or after processing or that outputs the image data after combining to a storage media (for example, a USB memory) as it is or after processing. Examples of the processing include processing of cutting one frame to make a still image when the image is a video image and processing of cutting a partial region of an image after combining. If the user shows an image, on which the operating state is reflected as described above, to another person (for example, a person in charge of the maintenance of the image forming apparatus 200), it is possible to transmit the operating state (failure position or the like) quickly and accurately rather than explaining the situation in words.

In addition, the user item may be set commonly for the plural image forming apparatuses 200 or may be set differently depending on the model, for example. Instead of specifying the user attribute (classification information) called a user item, it is also possible to specify every user and set an image ID and a combining method corresponding to each user. In short, a mobile terminal may include a user specifying unit that specifies a user of an apparatus to be imaged and a memory that stores plural images for one operating state, and an image corresponding to the specified user may be determined as an object of combining processing with reference to the memory. On the contrary, for example, when a function executed in an apparatus to be imaged is not related to the operation user, it is possible to omit using the information regarding a user when determining the content of combining processing. In addition, a timing of acquisition of information regarding a user, such as a user item, is arbitrary.

The hardware configuration for realizing the functions of the mobile terminals 300 and 300A and the server apparatus 400 described above is an example, and any mounting method and shape of the hardware may be adopted. For example, the above-described plural functions may be realized by one processor, or plural processors may collaborate with each other in order to realize one function. In addition, a program for realizing the functions of the server apparatus 400 and the mobile terminal 300 (mobile terminal 300A) as a computer may be provided in a state stored in computer readable storage media, such as magnetic storage media (for example, a magnetic tape, a magnetic disk (HDD; Hard Disk Drive), and an FDD (Flexible Disk Drive)), optical storage media (for example, an optical disc (CD; Compact Disc) and a DVD (Digital Versatile Disc)), magneto-optical storage media, and a semiconductor memory. In addition, such a program may also be downloaded through a communication line, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image display device comprising:
an imaging unit configured to acquire a first image;
at least one processor configured to specify an object apparatus imaged by the imaging unit;
wherein the at least one processor is configured to acquire an operating state of the object apparatus;
wherein the at least one processor is configured to generate a second image corresponding to the specified object apparatus and the acquired operating state;

wherein the at least one processor is configured to determine a reference position of the first image acquired by the imaging unit;

wherein the at least one processor is configured to combine the second image with the first image using the reference position, to thereby generate a combined image; and a display configured to display the combined image.

2. The image display device according to claim 1,
wherein the object apparatus is an image forming apparatus.

3. The image display device according to claim 1,
wherein the imaging unit is configured to acquire images of the object apparatus captured from a plurality of viewing points, and wherein the at least one processor is configured to combine one of the acquired images corresponding to the operating state with the generated image.

4. The image display device according to claim 3, wherein the at least one processor is configured to specify a user of the object apparatus, wherein the image display device further comprises a memory that stores a plurality of images for one operating state, and wherein the at least one processor is configured to determine an image corresponding to the specified user as an object of combining processing with reference to the memory.

5. The image display device according to claim 1,
wherein the at least one processor is configured to detect a sheet-like recording medium, which is attached to the object apparatus and on which an image showing the reference position is formed, from the image acquired by the imaging unit.

6. The image display device according to claim 1, further comprising:
an output unit configured to output the image as video data or still image data.

7. The image display device according to claim 1,
wherein the at least one processor is configured to request the object apparatus to transmit the operating state.

8. The image display device according to claim 1,
wherein a pre-determined period and the image displayed on the display are stored in response to position information being not detected.

9. The image display device according to claim 1,
wherein the image is an image schematically showing an operating state relevant to a part which a user of the object apparatus has difficulty in recognizing.

10. A non-transitory computer readable medium that stores a program causing a computer to execute a process, the process comprising:
specifying an object apparatus to be imaged from an input image;
acquiring, by at least one processor, an operating state of the object-apparatus;
generating an image corresponding to the specified object apparatus and the acquired operating state;
determining a reference position of the input image; and
combining the generated image with the input image using the reference position.

11. A mobile terminal comprising:
an imaging unit configured to acquire a first image;
at least one processor configured to specify an object apparatus imaged by the imaging unit;
wherein the at least one processor is configured to acquire an operating state of the object apparatus;
a transmission unit configured to transmit the specified object apparatus and the operating state to a server;
a receiving unit configured to receive from the server a second image corresponding to the specified object apparatus and the acquired operating state;
wherein the at least one processor is configured to determine a reference position of the first image acquired by the imaging unit;
wherein the at least one processor is configured to combine the second image with the first image using the reference position, to thereby generate a combined image; and
a display configured to display the combined image.

12. An image display method comprising:
acquiring a first image by an imaging unit;
specifying an object apparatus imaged by the imaging unit;
acquiring an operating state of the object apparatus;
generating a second image corresponding to the specified object apparatus and the acquired operating state;
determining a reference position of the first image acquired by the imaging unit;
combining the second image with the first image using the reference position, to thereby generate a combined image; and
displaying the combined image.

* * * * *